Figure 1:
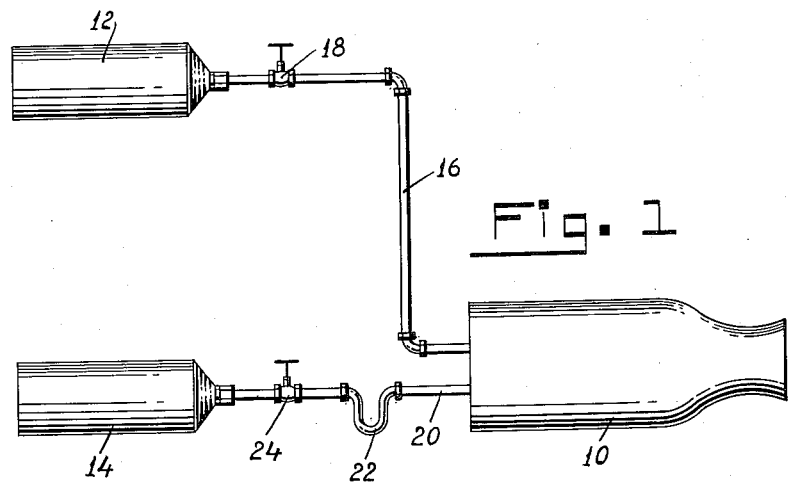

March 13, 1962 — E. O. KALIL — 3,024,594
PROPELLANTS FOR ROCKET MOTORS
Filed March 3, 1949

INVENTOR.
EMIL O. KALIL
BY Virgil H. Davies
and Albert P. Davis
ATTORNEYS

United States Patent Office 3,024,594
Patented Mar. 13, 1962

3,024,594
PROPELLANTS FOR ROCKET MOTORS
Emil O. Kalil, Brooklyn, N.Y., assignor to The M. W. Kellogg Company, Jersey City, N.J., a corporation of Delaware
Filed Mar. 3, 1949, Ser. No. 79,507
2 Claims. (Cl. 60—35.3)

The present invention relates to propellants for rocket motors and more particularly relates to bipropellants comprising a fuel and an oxidant therefor that ignite spontaneously upon contact with each other.

Rocket motors can be powered by several general types of propellants. For example, the propellant can be a solid, it can be a single liquid or gas, or it can be a bipropellant comprising a normally liquid or gaseous fuel and a normally liquid or gaseous oxidant. When normally gaseous fuels and/or oxidants are employed, it is customary to supply them to the rocket motor in liquid form. Bipropellants comprising a liquid fuel and a liquid oxidant provide certain definite advantages over other types of propellants. For example, a liquid bipropellant makes it possible to provide, in a relatively small space, a rocket motor with sufficient propellant for a relatively long run; the propellant is not dependent upon oxygen from the atmosphere to support combustion; and the two liquids can be supplied to the rocket motor at predetermined rates and ratios by means of pumps or pressurized containers.

When a liquid bipropellant is used, the two fluids are injected into the rocket thrust cylinder substantially simultaneously, or with the oxidant slightly in advance of the fuel, and in finely atomized or gaseous form. Combustion takes place in the thrust cylinder to develop a large volume of gas therein which is under considerable pressure; it is this gas escaping from the thrust cylinder which propels the rocket motor.

It is of great importance that the two components of a bipropellant ignite substantially immediately upon their contact with each other in the thrust cylinder of the rocket motor if hard starts are to be eliminated and reliable operation obtained. When the two components comprising a bipropellant ignite spontaneously substantially immediately after coming in contact with each other, easy, predictable, dependable, and reproducible starts are assured, and in addition there is no danger that combustion once started will stop.

It is accordingly one object of the present invention to provide a composition which will ignite spontaneously when contacted by selected oxidizing agents.

It is another object of the present invention to provide a method of forming a rocket fuel that ignites spontaneously upon contact with a selected oxidant.

It is another object of the present invention to provide an apparatus for making a fuel for a rocket motor that will ignite spontaneously upon contact with a selected oxidant.

It is another object of the present invention to provide a relatively low cost, efficient rocket fuel capable of igniting spontaneously upon contact with an oxidant and which has a freezing point lower than the ambient temperature at which the rocket it is employed in must operate.

It is another object of the present invention to provide a bipropellant for a rocket motor that ignites spontaneously when the two elements thereof are brought into contact with each other.

Other objects of the invention will in part be obvious and will in part appear hereinafter.

The invention accordingly comprises the product possessing the features, properties and relation of components; the process involving the several steps and the relation and the order of one or more of such steps with respect to each of the others; and the apparatus possessing the construction, combination of elements and arrangement of parts which are exemplified in the following detailed disclosure, and the scope of the application of which will be indicated in the claims.

Figure 2:
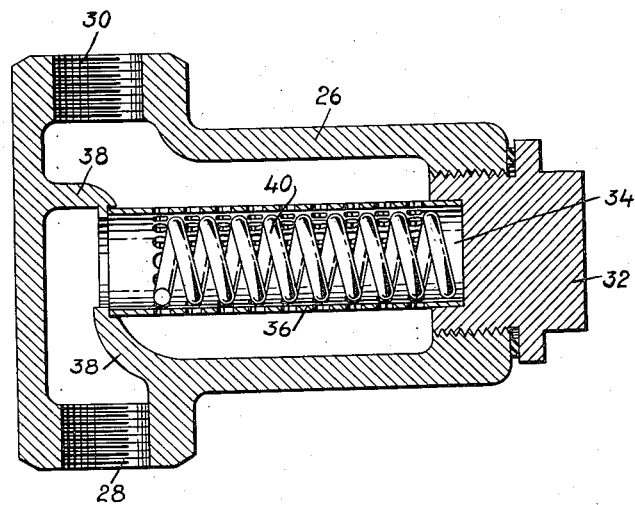

For a fuller understanding of the nature and object of the invention, reference should be had to the following detailed description taken in connection with the accompanying drawing wherein;

FIG. 1 is a diagrammatic drawing of a rocket motor adapted to employ the fuel of the present invention to initiate combustion therein; and FIG. 2 is a somewhat diagrammatic sectional view of an apparatus for manufacturing the rocket fuel of the present invention immediately prior to its injection into a rocket thrust cylinder.

The present invention provides a fuel for a rocket motor comprising a relatively stable liquid to which there has been added a material capable of changing the stability characteristics of said liquid to make it capable of igniting spontaneously upon contact with a suitable oxidant. The present invention also provides a method of making and using such a rocket fuel, and an apparatus for making said rocket fuel, wherein said relatively stable liquid is passed over a supply of said material immediately prior to the injection of the fuel into the rocket combustion chamber.

Anhydrous ammonia is a well known and highly effective fuel for use in rocket motors inasmuch as it reacts favorably with the commonly used oxidants, for example, a highly concentrated solution of nitric acid or white fuming nitric acid or red fuming nitric acid, to give high thrust characteristics to the motor employing it. Ammonia possesses further advantages in that it is relatively inexpensive and safe and is relatively easy to obtain and to store.

A major objection to the use of anhydrous ammonia and an oxidant as a bipropellant for a rocket motor has been the difficulty experienced in igniting the two fluids in the thrust cylinder of the rocket motor and, upon some occasions, in maintaining the reaction between the two fluids once ignition has started. Prior to the present invention it was necessary to provide the thrust cylinder of a rocket motor, adapted to employ such a bipropellant, with some auxiliary ignition means, as for example, a spark plug, glow coil, or a pilot flame. The provisions of such auxiliary ignition means made it necessary to equip the rocket motor with electric wiring and a source of electric power, or additional piping, valves, and a source of fuel for a pilot flame. All of these were cumbersome, consumed space, were potential sources of failure and involved the addition of undesirable weight to the rocket motor, all obviously highly undesirable in rocket motors primarily designed for airborne application.

I have found that a small quantity of one or more of the alkali metals, dissolved in anhydrous ammonia gives a fuel that will ignite spontaneously substantially immediately upon contact with selected oxidants. The exact amount of alkali metal, either lithium, sodium, potassium, rubidium, or cesium that must be dissolved in the anhydrous ammonia to give this result in a satisfactory practical operational way is quite small, and is in the order of .01%. For example, a solution of anhydrous ammonia and lithium containing in the order of .01% lithium by weight was ignited spontaneously upon contact with any one of the following oxidants, a 97% solution of nitric acid, white fuming nitric acid, or red fuming nitric acid at a temperature as low as —33° C. Anhydrous ammonia solutions of alkali metal containing a higher concentration of alkali metal than .01% give equally satisfactory results. In fact, saturated solutions, wherein the ammonia has dissolved all of the alkali metal that it can contain, ignited spontaneously when contacted by nitric acid and the combustion thus initiated continued satisfactorily. However, due primarily to economic considerations, and the speed and ease with which dilute solutions can be prepared, it is preferred to use a fuel containing only enough alkali metal to insure reliable ignition. For this purpose, as stated above, a solution containing in the order of 0.1% alkali metal is satisfactory.

The fuel of the present invention may be used in several different ways. For example, the entire fuel supply of a rocket motor may comprise a solution of anhydrous ammonia and one of the alkali metals, or a small quantity of the ammonia-alkali metal solution can be placed in the supply line, preferably in a U-tube, leading from the supply of ammonia to the rocket motor, so that when the rocket motor is started the spontaneously combustible fuel will enter the thrust cylinder ahead of the anhydrous ammonia to contact the oxidant and start combustion. A sufficient quantity of the ammonia-alkali metal fuel is utilized to initiate the combustion reaction and to bring it to equilibrium. When this point is reached and the ammonia-alkali metal fuel exhausted, the ammonia fuel immediately follows it into the thrust cylinder where it is ignited by the reaction, and combustion thus continues uninterrupted.

A third manner of using the fuel comprises dissolving the alkali metal in the ammonia immediately prior to its entry into the rocket motor thrust cylinder. This can be done by passing the anhydrous ammonia over a small quantity of the alkali metal as the ammonia passes from its storage tank to the rocket thrust cylinder. The last mentioned method of providing and utilizing the fuel of the present invention in a rocket motor is preferred inasmuch as it does not make storage of the ammonia-alkali metal fuel necessary for any appreciable length of time. This is desirable because an ammonia solution of any one of the alkali metals is unstable inasmuch as the alkali metal reacts with the ammonia to form an amide of the particular metal.

FIG. 1 is a diagrammatic view of a rocket motor adapted to use the above described ammonia-alkali metal fuel. The complete unit comprises a rocket thrust cylinder 10, a tank 12 adapted to contain an oxidant such as nitric acid, a second tank 14 adapted to contain a supply of fuel such as anhydrous ammonia or the ammonia-alkali metal fuel of the present invention, tubing 16 connecting tank 12 to thrust cylinder 10 and adapted to conduct oxidant into thrust cylinder 10, and tubing 20 which includes U-tube 22, connecting tank 14 to thrust cylinder 10, and adapted to conduct fuel into thrust cylinder 10. Valves 18 and 24 are provided to control the flow of their respective fluids through tubing 16 and 20. It will be understood that thrust cylinder 10 is provided with an injector, that may be of any conventional design, capable of injecting the propellants supplied by tubes 16 and 20 into combustion cylinder 10 in the proper form for rapid and complete combustion. The oxidant and fuel in tanks 12 and 14 respectively are provided to the injector at predetermined pressures by pressurizing their respective tanks or by means of suitable pumps.

When all of the fuel to be used is the above described ammonia-alkali metal fuel, all of the fuel placed in tank 14 is said ammonia-alkali metal fuel. When it is desired to use the ammonia-alkali metal fuel of the present invention to start combustion of an ammonia nitric acid bipropellant and bring the reaction to equilibrium, tank 14 is filled with anhydrous ammonia, and U-tube 22 is filled with the ammonia-alkali metal fuel of the present invention. When valve 24 is open, the anhydrous ammonia forces the ammonia-alkali metal fuel ahead of it and into thrust cylinder 10 where said ammonia-alkali metal fuel ignites spontaneously upon contact with the nitric acid from tank 12 and combustion goes forward until equilibrium is reached. When the ammonia-alkali metal solution has all passed into thrust cylinder 10, it is followed by the anhydrous ammonia which enters into the reaction which is underway, and because said reaction is at equilibrium the reaction between the ammonia and the nitric acid injected from tank 12 becomes self-sustaining.

Where it is desired to have the rocket motor ready for instantaneous use over extended periods of time it is prefererd to dissolve the alkali metal in the anhydrous ammonia substantially immediately before the solution is injected into thrust cylinder 10. FIG. 2 is a somewhat diagrammatic sectional view disclosing an apparatus for so dissolving the alkali metal. This apparatus comprises a housing 26 having an inlet opening 28 and an outlet opening 30. One end of housing 26 is threaded to receive a plug 32, the inner end of which is recessed as at 34 to hold one end of a perforated cylinder 36. The other end of the perforated cylinder is held in communication with the inlet opening 28 by means of partition members 38. A helical coil 40 of alkali metal is contained within perforated cylinder 36 and can be replaced when exhausted by removing plug 32.

In using the apparatus disclosed in FIG. 2 in combination with the apparatus disclosed in FIG. 1 to make the ammonia-alkali metal fuel of the present invention immediately prior to its entry into thrust cylinder 10, the device of FIG. 2 is substituted for U-tube 22 in such a manner that inlet opening 28 is in communication with tank 14 and outlet opening 30 is in communication with thrust cylinder 10. It will thus be seen that when valve 24 is open, anhydrous ammonia will pass from tank 14 into housing 26 through inlet opening 28 and be directed by means of partition members 38 into perforated cylinder 36 and around the helical winding 40 of alkali metal. As the anhydrous ammonia passes over the helix 40 of alkali metal it dissolves a small but sufficient amount of the alkali metal to make a fuel capable of igniting spontaneously when it comes in contact with either red fuming nitric acid or white fuming nitric acid. The fuel thus formed passes out of cylinder 36 through the perforations formed therein and then out of housing 26 through outlet opening 30 and into thrust cylinder 10.

As stated above the amount of alkali metal that must be dissolved in the anhydrous ammonia to make the rocket fuel of the present invention is small. The exact concentration of the solution formed using the method of flowing anhydrous ammonia over an alkali metal can be controlled by limiting the surface area of the alkali metal to a predetermined value for a unit rate of flow of ammonia. For example, when using the device of FIG. 2 with a 250 pound thrust rocket motor, an 18 inch length of lithium wire weighing 2.2 grams was wound to form helix 40, and gave very satisfactory starts. This piece of lithium was sufficient to treat 50 pounds of anhydrous ammonia. The weight loss of lithium in this operation indicates that the solution thus produced contained approximately .01% lithium.

It is possible to use smaller concentrations of lithium in many applications and obtain spontaneous combustion, as for example, when the ambient temperatures of the propellants are relatively high. Furthermore, it is often desirable to employ concentrations of lithium smaller than those that will give spontaneous combustion to impart desirable characteristics to the fuel, as for example, easy and reliable starts in rocket motors equipped with conventional starting devices.

The apparatus of FIG. 2 also makes it possible to stop and restart in use rocket motors that are equipped with it, inasmuch as it is only necessary to provide the device with a sufficiently large quantity of the alkali metal to insure that all of said metal will not be dissolved before it is desired to stop and restart the motor. When all of the alkali metal in the device of FIG. 2 has been used it can be replaced by removing plug 32 and inserting a new helix of alkali metal in perforated cylinder 32.

It will be obvious to those skilled in the art that housing 26 can be filled with a fluid such as kerosene to protect the alkali metal coil 40 from decomposition while the rocket motor is in a stand by status. When ammonia is passed through the device it will force this protective fluid out of housing 26 and into thrust cylinder 10 where it will either be consumed by the subsequent combustion of the propellants or pass out of the thrust cylinder along with the products of combustion.

The composition comprising the present invention has been specifically described in connecteion with a rocket motor. However, it will be obvious that the composition will have many applications other than in connection with rocket motors. Also, nitric acid has been specifically disclosed in the examples as the oxidant. Obviously, other oxidants may be used, as for example, peroxide or a mixture of nitric and sulfuric acids. It is not intended by reason of the above description to limit the invention to rocket motors.

Since certain changes may be made in the above fuel, process and apparatus without departing from the scope of the invention herein involved, it is intended that all matter contained in the above description or shown in the accompanying drawing shall be interpreted as illustrative and not in a limiting sense.

What is claimed is:

1. In the method of initiating the combustion of anhydrous ammonia and nitric acid, the steps comprising contacting nitric acid with a solution of anhydrous ammonia and an alkali metal to cause spontaneous combustion of said acid and said solution to take place, and feeding nitric acid and anhydrous ammonia to the reaction thus started, said alkali metal comprising lithium, ranging from about .01% by weight of said solution to an amount sufficient to form a saturated solution.

2. A method for the combustion of bipropellant components in a rocket motor having a thrust cylinder adapted to be powered by nitric acid and anhydrous ammonia, comprising the steps of injecting nitric acid into said thrust cylinder, substantially simultaneously therewith injecting a solution of anhydrous ammonia and an alkali metal into said thrust cylinder and in contact with said nitric acid to cause spontaneous combustion, discontinuing the injection of said solution when equilibrium is reached and substantally concurrent therewith injecting anhydrous ammonia into said thrust cylinder to continue said combustion, said alkali metal comprising lithium, ranging from about .01% by weight of said solution to an amount sufficient to form a saturated solution.

References Cited in the file of this patent

UNITED STATES PATENTS

| | | |
|---|---|---|
| 1,063,707 | Lummus | June 3, 1913 |
| 1,374,291 | Dunkley | Apr. 12, 1921 |
| 1,478,889 | Cedarberg | Dec. 25, 1923 |
| 1,854,615 | Lasley | Apr. 19, 1932 |
| 2,357,184 | Frejacques | Aug. 29, 1944 |
| 2,393,594 | Davis | Jan. 29, 1946 |
| 2,414,116 | Miller | Jan. 14, 1947 |
| 2,433,932 | Stosick | Jan. 6, 1948 |
| 2,433,943 | Zwicky et al. | Jan. 6, 1948 |
| 2,437,694 | Hickman | Mar. 16, 1948 |
| 2,455,205 | Whetstone et al. | Nov. 30, 1948 |
| 2,470,082 | Tyre et al. | May 10, 1949 |
| 2,474,183 | King | June 21, 1949 |
| 2,495,216 | Longwell et al. | Jan. 24, 1950 |
| 2,499,295 | Bruce et al. | Feb. 28, 1950 |
| 2,500,334 | Zucrow | Mar. 14, 1950 |

FOREIGN PATENTS

| | | |
|---|---|---|
| 17,696 | Great Britain | Dec. 7, 1915 |

OTHER REFERENCES

Mellor: Comprehensive Treatise on Inorganic and Theoretical Chem., vol. 2, page 469.

Franklin et al.: In Amer. Chem. Journal, vol. 20, pp. 820–836 (1898).

Journal of The American Rocket Society, vol. 72, December 1947, pp. 14–21.